United States Patent
Marschall et al.

(10) Patent No.: US 7,415,103 B2
(45) Date of Patent: Aug. 19, 2008

(54) METHOD AND CONFIGURATION FOR CONTROLLING AND/OR MONITORING A TERMINAL CONNECTED TO A COMMUNICATIONS SYSTEM

(75) Inventors: Andreas Marschall, Essen (DE); Otto Schröter, Essen (DE)

(73) Assignee: Siemens Aktiengesellschaft, Munich (DE)

( * ) Notice: Subject to any disclaimer, the term of this patent is extended or adjusted under 35 U.S.C. 154(b) by 170 days.

(21) Appl. No.: 10/542,444

(22) PCT Filed: Dec. 17, 2003

(86) PCT No.: PCT/DE03/04171

§ 371 (c)(1),
(2), (4) Date: Apr. 11, 2006

(87) PCT Pub. No.: WO2004/068830

PCT Pub. Date: Aug. 12, 2004

(65) Prior Publication Data

US 2006/0159250 A1    Jul. 20, 2006

(30) Foreign Application Priority Data

Jan. 17, 2003    (DE)    ................................. 103 01 685

(51) Int. Cl.
*H04M 1/00*    (2006.01)
*H04M 3/42*    (2006.01)

(52) U.S. Cl. .............. 379/165; 379/201.03; 379/201.12

(58) Field of Classification Search ............... 379/32.01, 379/156, 165, 201.02, 201.03, 201.12, 226, 379/227, 231, 234

See application file for complete search history.

(56) References Cited

U.S. PATENT DOCUMENTS 5,952,934 A * 9/1999 Matsumoto et al. ..... 340/825.52

(Continued)

FOREIGN PATENT DOCUMENTS

EP    1 126 685 A2    8/2001

OTHER PUBLICATIONS

Novell Inc., Lucent Technologies, "NetWare Telephony Services Application Programming Interface (TSAPI), Version 2 Issue 3.0", Apr. 1998, pp. 1-40, XP-002267338.

*Primary Examiner*—Quoc D Tran

(57) ABSTRACT

The invention relates to a method and configuration for controlling and/or monitoring terminals connected to a communications system. In order to control and/or monitor terminals, which are connected to a communications system and which have at least one controllable/monitorable function, an application sends a first message with the call number of a terminal, which is to be controlled and/or monitored thereby, to a telephony server. This telephony server conveys this call number to the communications system that, as a response, conveys terminal information via the controllable/monitorable functions of the relevant terminal. The telephony server comprises a database with data records that describe controllable/monitorable terminals, and comprises at least one data record which can be supplemented and which contains an identification number. This data record can be supplemented with the call number and the information concerning said terminal, whereby the telephony server generates another supplementable data record with another identification number. The telephony server conveys the call number and the terminal information to the application from the supplemented data record. The terminal can thus be controlled/monitored by the application.

20 Claims, 8 Drawing Sheets

U.S. PATENT DOCUMENTS

| | | |
|---|---|---|
| 6,343,116 B1 | 1/2002 | Quinton et al. |
| 6,804,339 B1 * | 10/2004 | Hettish .................. 379/201.01 |
| 6,856,616 B1 * | 2/2005 | Schuster et al. ............. 370/352 |
| 7,046,659 B1 * | 5/2006 | Woundy ..................... 370/352 |
| 2003/0120783 A1 * | 6/2003 | Marschall et al. ........... 709/227 |
| 2004/0165713 A1 * | 8/2004 | Leighton .................... 379/225 |

* cited by examiner

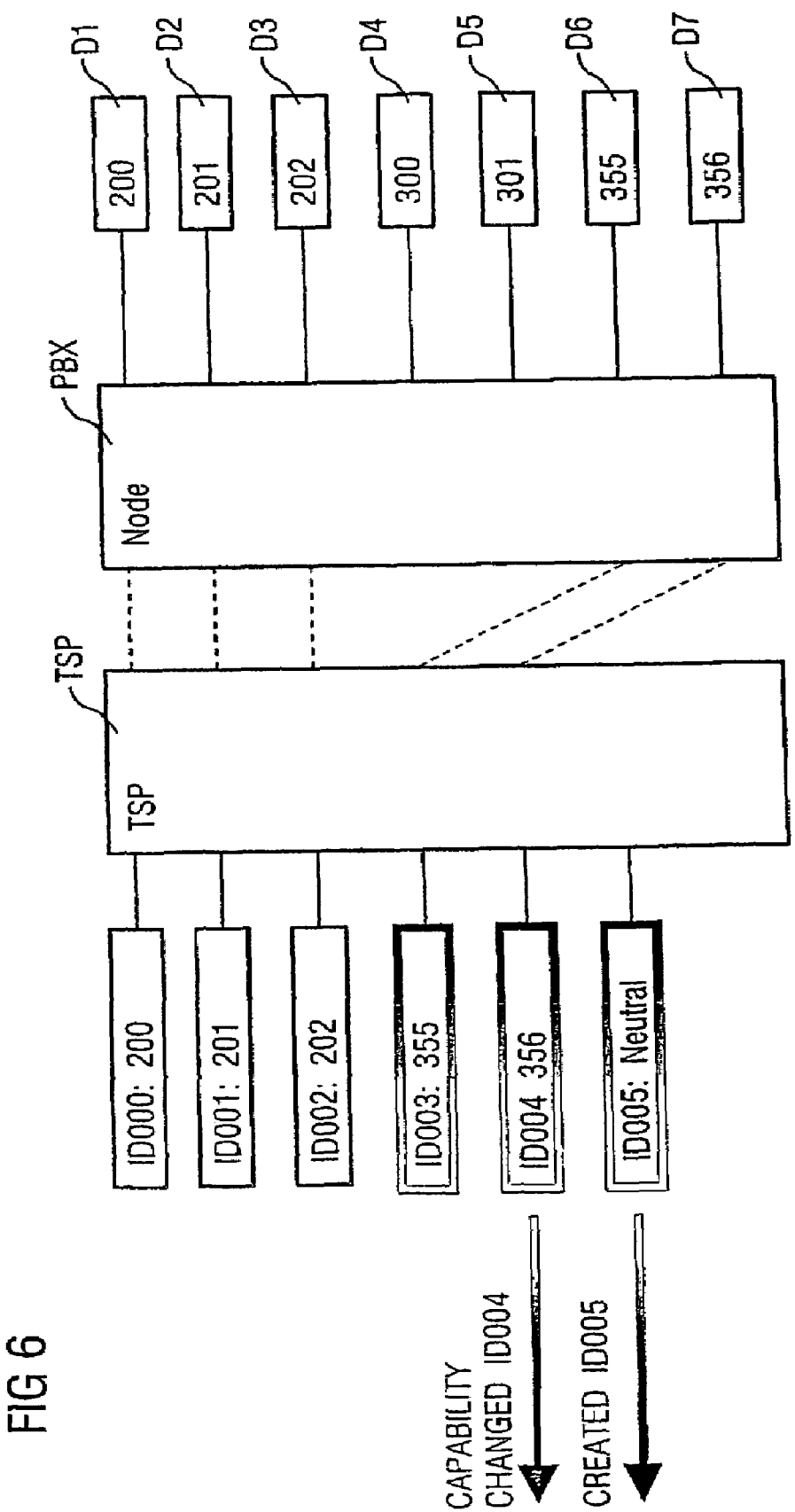

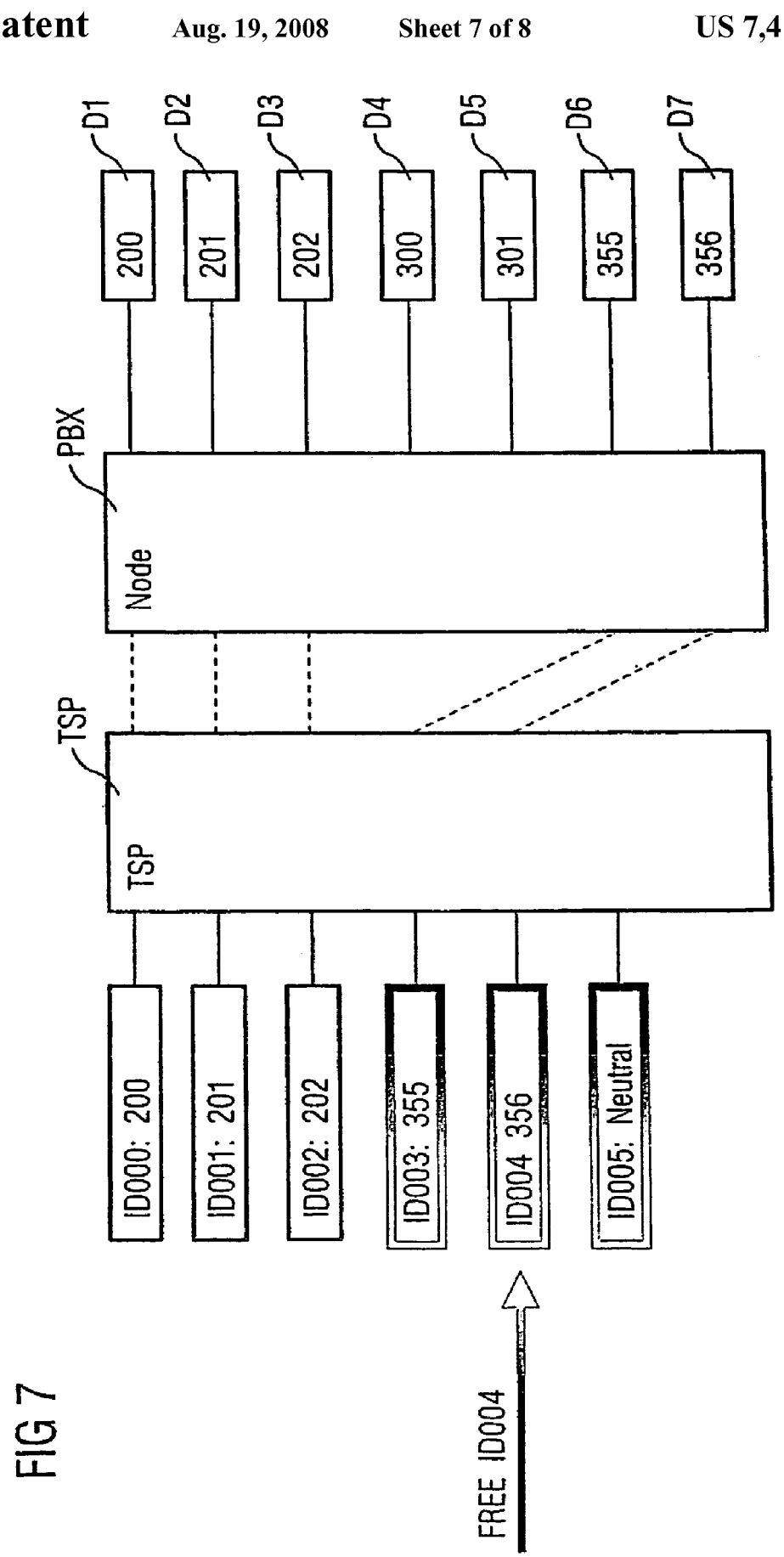

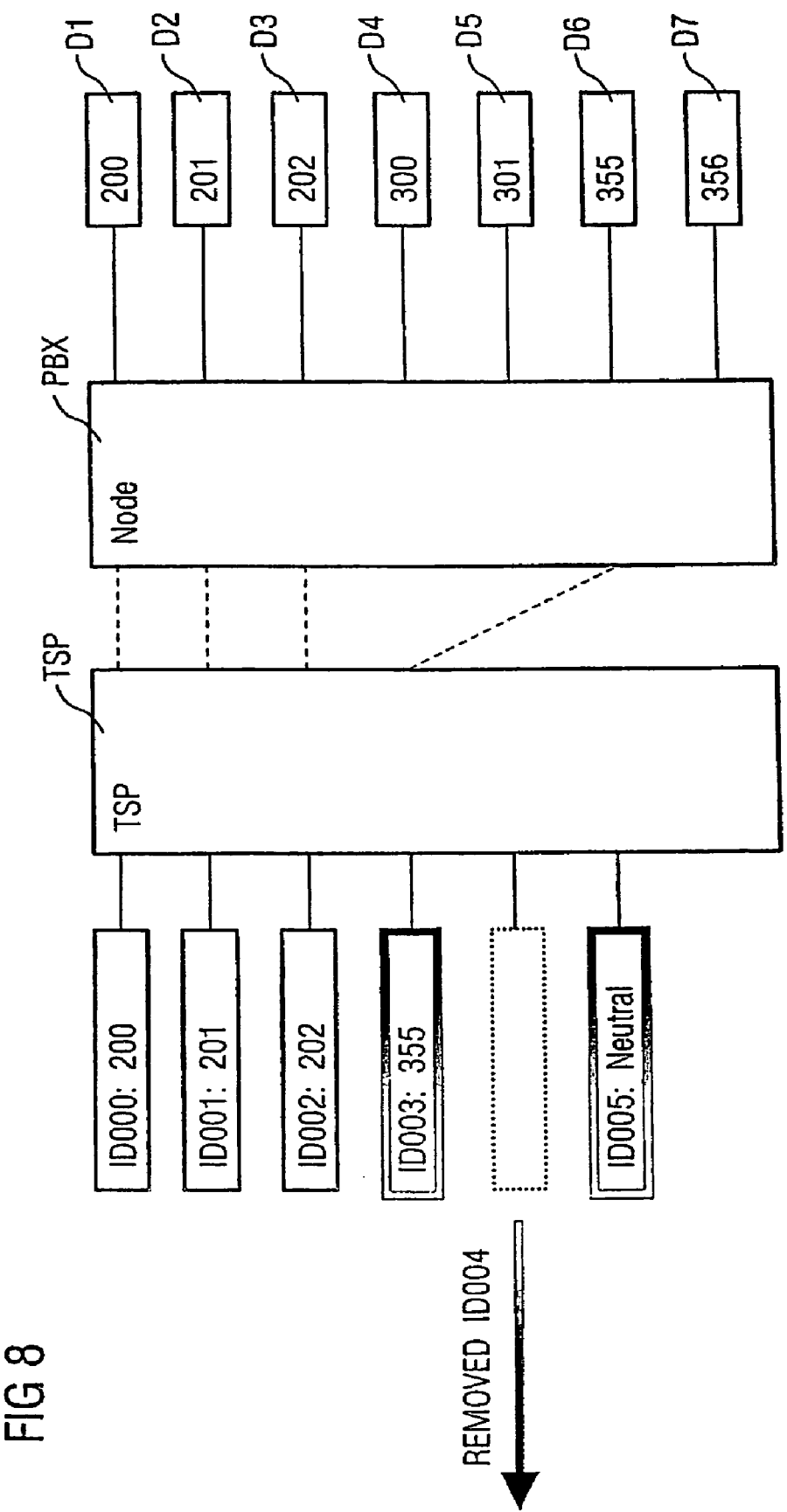

METHOD AND CONFIGURATION FOR CONTROLLING AND/OR MONITORING A TERMINAL CONNECTED TO A COMMUNICATIONS SYSTEM

CROSS REFERENCE TO RELATED APPLICATIONS

This application is the US National Stage of International Application No. PCT/DE2003/004171, filed Dec. 17, 2003 and claims the benefit thereof. The International Application claims the benefits of German application No. 10301685.6 filed Jan. 17, 2003, both applications are incorporated by reference herein in their entirety.

FIELD OF THE INVENTION

The invention relates to a method for controlling and/or monitoring a terminal connected to a communication system, and to an arrangement for carrying out the method.

SUMMARY OF THE INVENTION

In modern communication systems and communication arrangements, communication terminals and connections are frequently controlled and/or monitored with the aid of PC-supported applications. The link between communication terminals and connections and PC-supported control programs is frequently also referred to in the literature as CTI ("Computer Telephony Integration"); the hardware and software required to carry out the monitoring and control function is frequently summarized by the expression a CTI solution.

CTI solutions can be used in a worthwhile form not only in arrangements with line-switching communication, that is to say for example with "traditional" analog and ISDN communication systems, but are also advantageously used in packet-switching communication arrangements, so-called voice over IP systems (VoIP). This is due inter alia to the fact that, for the connection between a communication node (that is to say the VoIP "communication system") and a VoIP communication terminal, VoIP communication arrangements frequently use those communication protocols which do not support all the service features which are known, for example, from line-switching communication.

In the case of CTI solutions, a distinction is drawn between so-called first party solutions and third party solutions. In the case of first party solutions, a terminal which is to be controlled and to be monitored is provided with a specific interface by means of which this terminal is connected directly to a computer PC which is used for control and monitoring. Since, in the case of this method, each terminal which is to be controlled and to be monitored must be equipped with a corresponding dedicated interface, so-called third party CTI solutions are preferably used especially for communication arrangements with a large number of terminals to be monitored and to be controlled, in which only the communication node (the communication system) itself is equipped with a computer interface. This interface is then connected to a server (TSP=Telephony Service Provider), which is accessed by all of the PCs with those applications which are used to control and to monitor communication subscribers (terminals) or communication interfaces ("subscriber lines", "trunks").

The connection between the TSP and the communication node is operated using a protocol that is standardized for this purpose, frequently the CSTA protocol (CSTA=Computer Supported Telephony Application). The TSP accesses the communication node via a standardized interface for the communication node, the so-called CSTA interface, where it results, for example, in the monitoring of individual communication interfaces or terminals, or else transmits commands in this way to the communication node, in order to carry out functions for specific terminals or lines. Access by a PC-supported application (CTI application) to the TSP likewise takes place on the basis of a standardized protocol, frequently on the basis of the TAPI protocol (TAPI=Telephony Application Programming Interface). The CTI applications which comply with this Standard are frequently also referred to as TAPI applications.

The TSP has a configuration databank (or accesses such a databank), in which a data record is stored for each terminal or line of the communication node which can be controlled or monitored. This data record has at least one sequential number (a so-called ID=Identification), which is specific to that data record, the telephone number of the relevant terminal or of the relevant connection, as well as a description of the functions of the respective terminal or of the respective line which can be controlled and/or monitored. A data record such as this is frequently also referred to as an object or as a "TAPI Line" ("line" for short). In this case, it should be noted that not only terminals and the subscriber connections associated with such terminals have a telephone number, and can thus be administered by a data record, but also exchange lines and cross-connect lines ("trunks"), terminal groups, voice mail servers and similar devices which are defined in a communication node, can be administered on the basis of a telephone number, and can thus also be managed in a TSP or in a databank associated with the TSP as a "TAPI line". Devices and lines such as these are also covered by the use of the expression "terminal" in the following text.

All of these objects and devices which can be controlled and/or monitored are referred to for short in the following text as terminals. In order to allow a CTI application to access a terminal (that is to say to control and/or to monitor it), at least two preconditions must be satisfied: firstly, this terminal must be managed by means of a data record as a "TAPI line" in the databank of a TSP and, secondly, the CTI application must be able to access this data record. Thus, before it can be used to control and/or monitor a terminal, a CTI application must therefore start a check in the TSP which is associated with this CTI application, and must find out whether the desired terminal is included with a data record in the TSP databank. The TSP then transmits various details to the CTI application, which once again include the telephone number, an identification number and a description of those functions ("capabilities") which can be controlled and/or monitored with respect to this terminal.

The known third party CTI solutions have been found to have the disadvantage that a CTI application can control and/or monitor only those terminals which are managed by means of an appropriate data record as a "TAPI line" in the TSP databank. Those terminals which cannot yet be accessed with the aid of the TSP which is associated with the respective CTI application must first of all be entered in the TSP databank by means of a separate administration process, which often has to be carried out manually, before they can be accessed by the CTI application.

One object of the invention is to simplify the configuration of CTI solutions.

This object is achieved by the claims.

The solution provides for the control and/or monitoring of terminals which are connected to a communication system and have at least one function which can be controlled and/or monitored, in which case an application which is installed on the PC sends a first message with the telephone number of a terminal which is to be controlled and/or to be monitored by it to a telephony server. The telephony server transmits this telephone number to the communication system, and, in a response, the communication system transmits terminal information which describes which of the functions of the terminal associated with this telephone number can be controlled and/or can be monitored. The telephony server has a databank with data records which describe terminals which can be controlled and/or monitored, and has at least one existing data record which can be added to, which contains an identification number for one of the terminals and which can have added to it the telephone number and the information received from the communication system for this terminal. The telephony server produces a further data record which can be added to with a further identification number, in which case the telephony server transmits the telephone number and the terminal information to the PC with the application from the data record which has been added to, so that the terminal can be controlled and/or monitored by the PC with the application. The provision of a data record which can be added to (a neutral data record) in the databank of the telephony server allows applications to also control and/or monitor those terminals which are not represented by a "TAPI line" in the databank. Apart from a data record which can be added to, the databank just has to store data records for those terminals which are actually controlled and/or monitored by one or more applications. There is thus no need for "precautional" registration of a large number of terminals or of all of the terminals in the databank which it is believed cannot yet be controlled and/or monitored at the time of configuration of the databank. The CTI arrangement is thus self-administrating, because a user need not carry out any (manual) actions on the databank in order to control and/or to monitor a terminal which has not yet been registered in the telephony server.

The method is refined further in an advantageous manner by the characterizing features of the dependent claims regarding the method. Preferred exemplary embodiments of the arrangement are included in the dependent claims regarding the arrangement, with their advantages being equivalent to the advantages of the corresponding refinements of the method.

A data record which can be added to may be associated with all types of terminals as defined in known applications provided that the terminal to be controlled is a communication terminal, a subscriber connection, an exchange connection, a cross-connect connection or some other connection of a communication system which can be controlled and/or monitored.

If the communication system is a communication node in a packet-switching network, the PC with the installed application can also control and/or monitor VoIP terminals and other devices and instances in VoIP communication arrangements.

A PC with an installed application can simultaneously access terminals of different communication nodes in a communication network, when a telephony server is interchanging terminal information with two or more communication systems or communication nodes.

The method can be used particularly effectively in a third party CTI solution when one terminal is controlled and/or monitored by two or more PCs with CTI applications.

The memory requirement for the databank is reduced by deleting a data record that has been added to when no PC with an application is controlling and/or monitoring the terminal associated with this data record. For this purpose, the data record in the databank is first of all released and is then deleted in a further step after the method steps that are carried out for control/monitoring.

If the number of data records in a telephony server which can be added to is always at least one, this ensures that one PC with an installed application always has access to a data record which can be added to.

The databank memory is optimally used when one and only one data record which can be added to is available.

One exemplary embodiment of the arrangement according to the invention will be explained in the following text with reference to the drawings, and will at the same time be used to explain the method according to the invention.

BRIEF DESCRIPTION OF THE DRAWINGS

FIG. 7 shows a schematic illustration of the release of a data record which has been added to but has not been used any further in the databank of the telephony server, and FIG. 8 shows a schematic illustration of the deletion of the released data record from the databank.

DETAILED DESCRIPTION OF THE INVENTION

Figure 1:
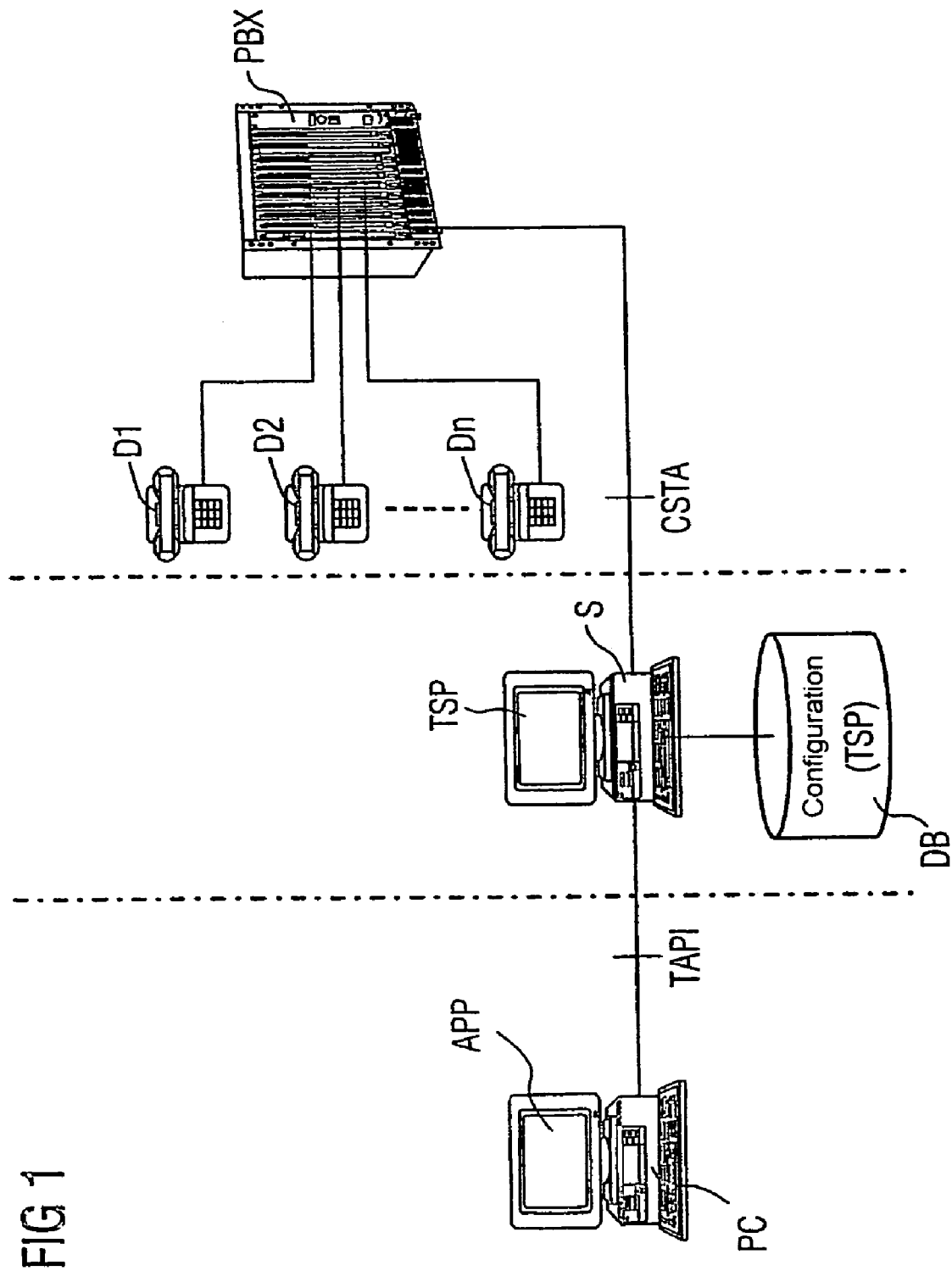
FIG. 1 shows an arrangement with a communication node with terminals connected to it, a telephony server and a PC with an installed application.

FIG. 1 shows an arrangement with a communication system PBX as a communication system (communication node) to which terminals telephones D1 ... Dn are connected. The communication system of PBX is an ISDN switching system, with the telephones D1 ... Dn each being connected via a separate line to corresponding terminal interfaces. A gatekeeper in a VoIP communication environment can also be used, of course, as a communication system; in this case, the terminal are appropriately equipped network elements in a speech data network, which are addressed on the basis of network addresses (IP addresses). The communication system PBX is equipped with a CTI interface, via which a server S is connected. The connection between the communication system PBX and the server S uses the CSTA protocol for data transmission; other communication protocols which are intended for control and monitoring of communication systems PBX may, also, of course be used at this point. The server S has installed software which provides this server S with the functionality of a telephony server TSP. The server S is also equipped with a configuration databank, the databank DB for short, for storage of data records. The server S is connected to computers (PCs) via a data network that is not illustrated here, and with only one computer PC being illustrated by way of example here. The computer PC has an installed application APP which makes it possible for the user of the computer PC to control and/or to monitor functions of the communication system PBX, of the terminals D1 ... Dn that are connected to the communication system PBX, and of further devices and lines that are not illustrated here.

The application APP which is installed on the computer PC is a so-called "TAPI" application (TAPI=Telephony Application Programming Interface). For this reason, information and commands are interchanged between the computer PC and the server S using the so-called TAPI protocol; other protocols may, of course, also be used for the application APP and for data transmission between the computer PC and the server S.

The application APP which is installed on the computer PC can control and/or monitor only those terminals and instances in the communication system PBX (the expression "control" is used for short for both processes in the following text) which are "known" in the databank DB associated with the telephony server TSP, that is to say they are represented by a data record in this databank DB. This situation is frequently described in the literature by saying that the application APP must have "access" to a TAPI line".

The following text using FIGS. 2 to 8 to explain the method steps which are required in order to store terminals which it has not yet been possible to control by the application APP so far as a data record in the databank DB and, conversely, also to once again remove terminals which are no longer to be controlled, and the data records associated with such terminals, from the databank DB again.

Figure 2:
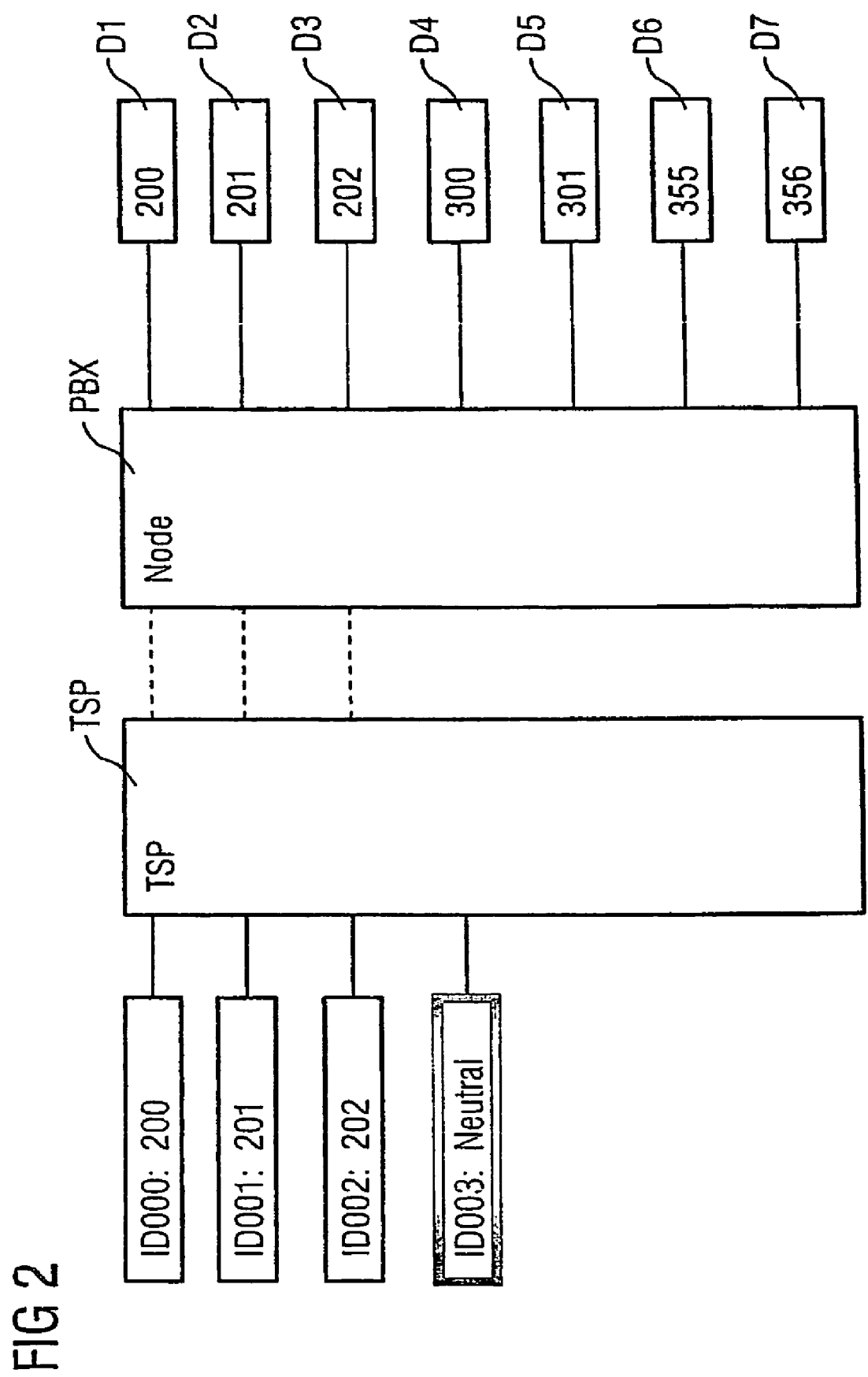
FIG. 2 shows a schematic illustration of the communication node and of the telephony server with data records that can be accessed.

FIG. 2 schematically illustrates the communication system PBX and the telephony server TSP. The illustration likewise shows, schematically, the terminals D1 ... D7 which are connected to the communication system PBX and have the respective terminal telephone numbers 200, 201, 202, 300, 301, 355, 356. In addition to the telephony server TSP, the illustration also shows the data records which are stored in the databank DB (not illustrated here) and which are accessed by the PC, which is likewise not illustrated here, with the installed application APP. The data records are respectively identified by an individual identification number ID000 ... ID003 as well as by the telephone number 200, 201, 202 of that terminal D1 ... D7 with which the respective data record is associated. The expression "neutral" in this case means that the relevant data record is a ("neutral") data record which can be added to and which does not yet have an associated telephone number, and is thus not yet associated with any of the terminals D1 ... D7. In FIG. 3 to FIG. 8, the same elements are likewise illustrated schematically with the same reference symbols; for this reason, these schematically illustrated elements will not be described once again with reference to FIGS. 3 to 8.

Figure 3:
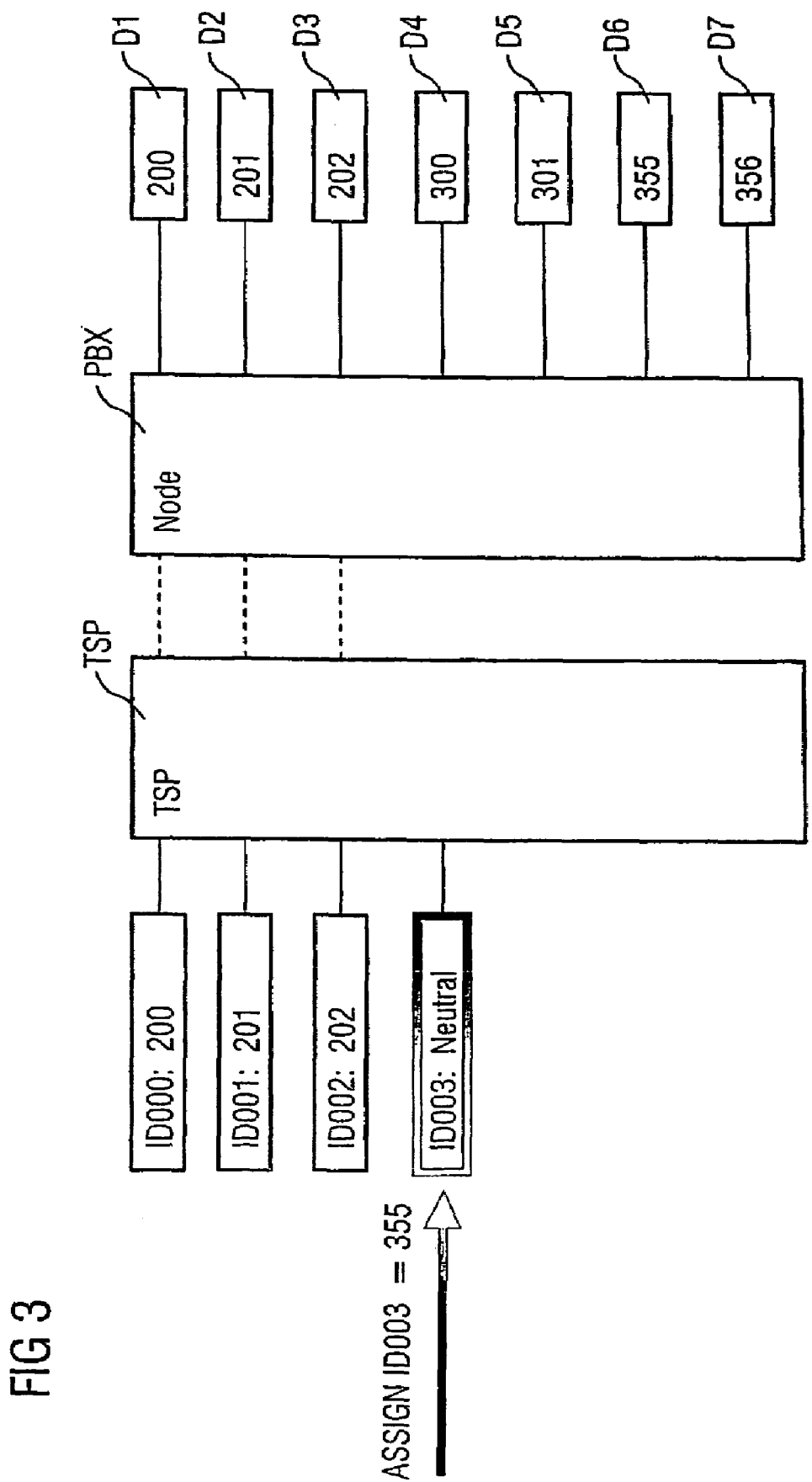
FIG. 3 shows a schematic illustration, showing the association between a terminal and a data record which can be added to, FIG. 4 shows a schematic illustration of the signaling of the data record which has been added to and the signaling of a new data record which can be added to to a PC-supported application (which is not shown here)

FIG. 3 schematically illustrates the situation in which the terminal D6, which has not yet been possible to control, with the telephone number 355 is intended to be monitored by the application APP. For this purpose, the application APP uses an assignment command ("assign") to access the data record with the identification number ID003 in the databank DB, which until now has been a neutral data record without any associated telephone number. The "assign" command is used to assign the telephone number 355 of the terminal D6 to this data record. The telephony server TSP accesses the communication system PBX via a CSTA connection, which is not illustrated here, and in the process checks whether a terminal D6 with the telephone number 355 exists, and if yes, what functions and characteristics of the terminal D6 can be controlled and/or monitored by what methods. This information is provided by the communication system PBX and is transmitted to the telephony server TSP, which in turn adds the appropriate information to the data record with the identification number ID003, thus providing this information to the application APP.

In this case, the assignment of telephone numbers and terminal information is not restricted to terminals D4 ... D7 which it has not yet been possible to control; it can also relate to terminals D1 ... D3 which are already represented in the databank DB and can then be controlled by two or more "TAPI lines".

Figure 4:
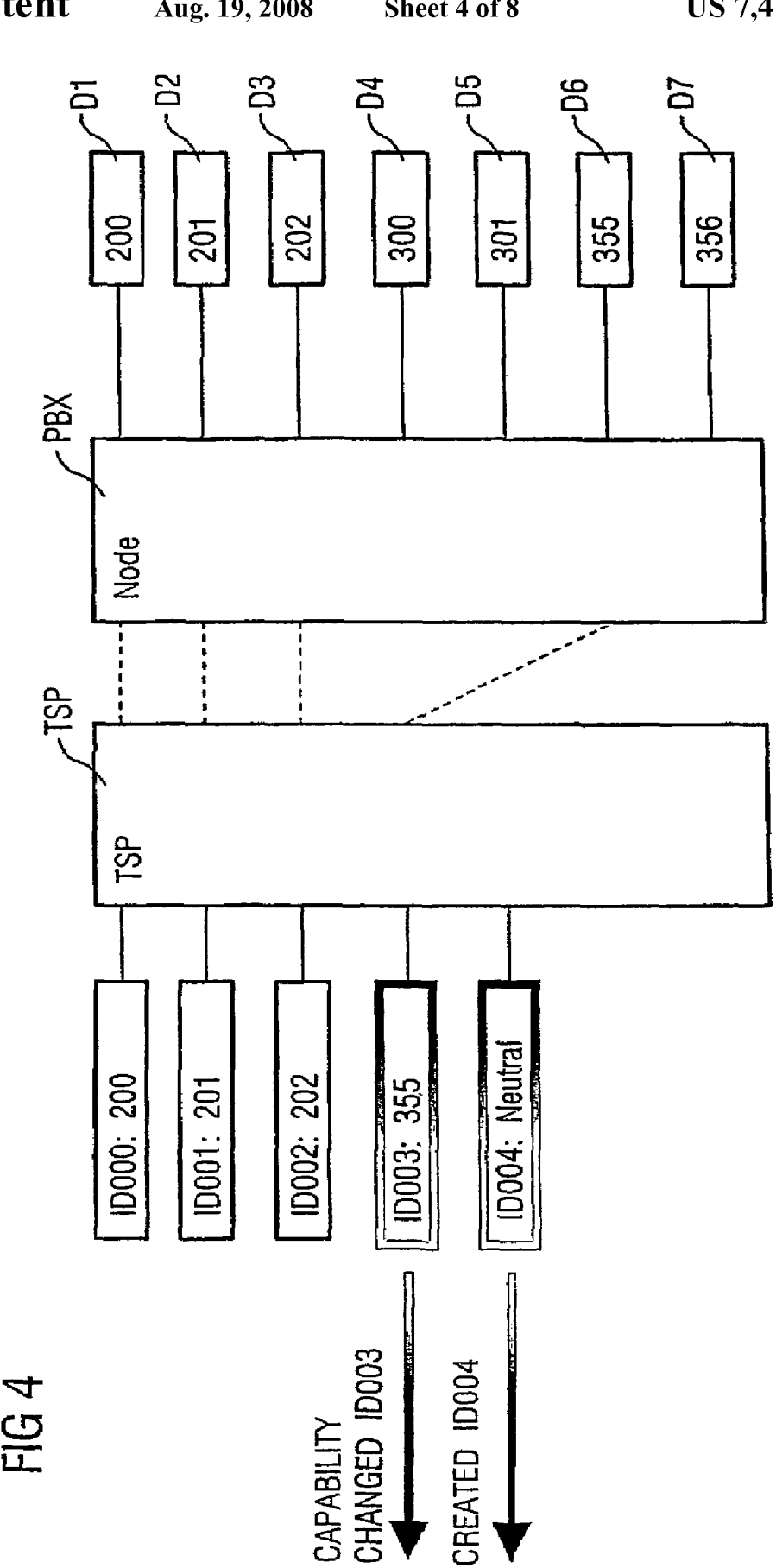

The assignment process has resulted in a (regular) data record which has been added to from the previously neutral data record ID003, by means of which the application APP can control the terminal D6. The process of signaling the data record ID003 which has now been added to to the application APP is illustrated in FIG. 4. At the time at which the previously neutral data record with the identification number ID003 became a regular data record by the addition of the telephone number information 335 and the information provided by the communication system PBX, a new neutral data record is produced by the telephony server TSP in the databank DB and now has the previously unused identification number ID004. The existence of the new neutral data record with the identification number ID004 is also signaled to the application APP; this process is illustrated schematically in FIG. 4.

If two or more applications access the telephony server TSP, the signal "capability changed ID003" about the change in the status of the data record ID003 is notified to all of the applications APP which have opened the corresponding line at this time. Furthermore, the information about the now new neutral data record with the identification number ID004 is signaled to all the active applications which are accessing the telephony server TSP.

Figure 5:
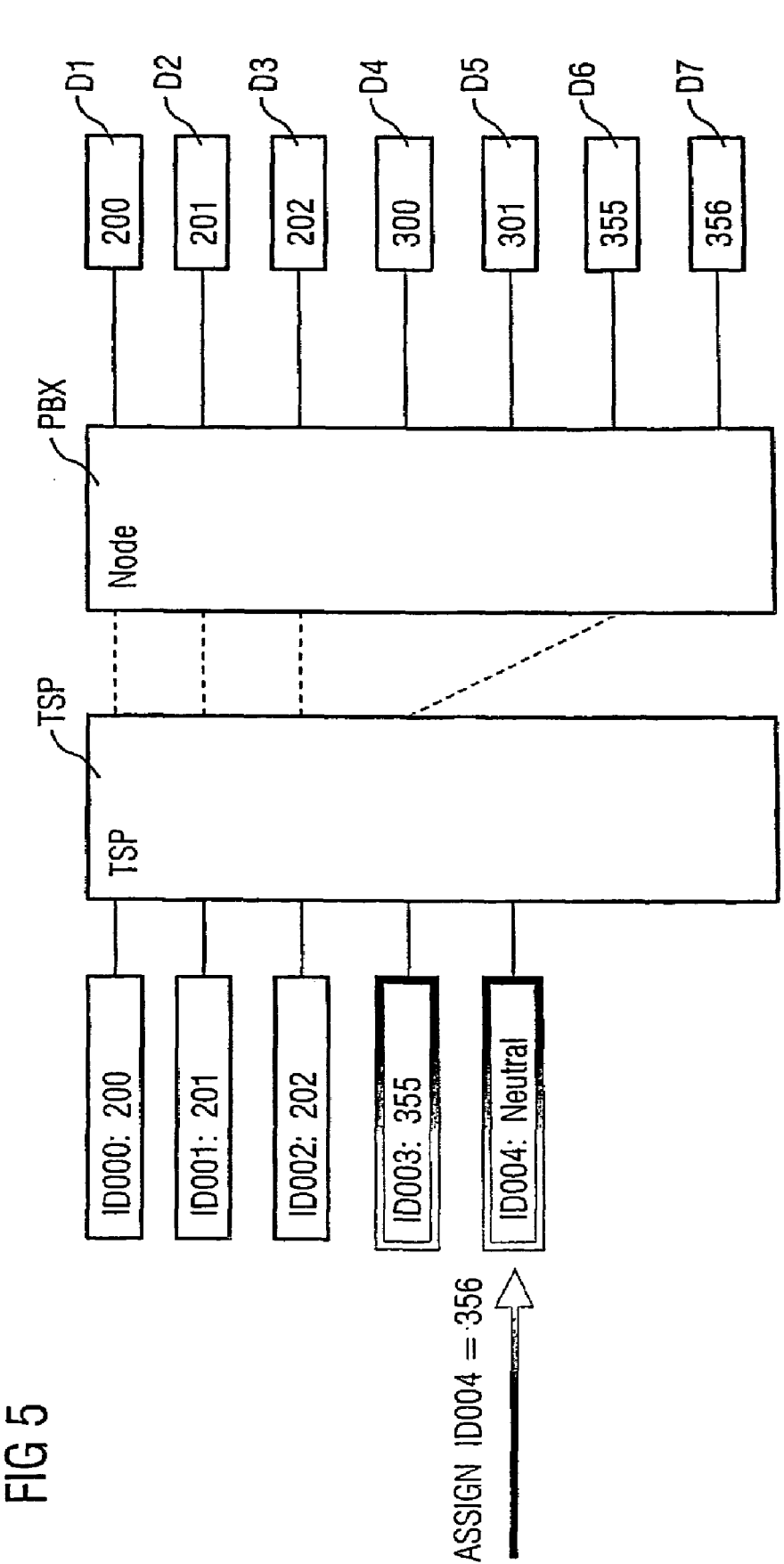
FIG. 5 shows the assignment of the telephone number of a further terminal, which it has not yet been possible to monitor so far, to a data record which can be added to, FIG. 6 shows a schematic illustration of the notification of the information about the changes that are illustrated schematically in FIG. 5 to a PC-supported application (which is not illustrated here)

FIG. 5 shows the "dynamic" assignment of a further telephone number 356 of a further terminal D7 to the "new" neutral data record with the identification number ID004. At this point as well, the application APP once again transmits an "assign" command, this time relating to the data record with the identification number ID004, to the telephony server TSP, where a check is initiated with the communication system PBX once again, analogously to the method relating to the terminal D6.

FIG. 6 shows the notification of the conversion of the data record, which until now has been neutral, with the identification number ID004 to a regular data record with the associated telephone number 356, in a schematic form. The notification process is carried out by a "capability changed ID004" signal, which is transmitted from the telephony server TSP to the applications APP. With the conversion of the data record with the identification number ID004 to a regular data record, the telephony server TSP has produced a new neutral data record with the identification number ID005 in the databank DB, whose existence is signaled by a "created ID005" signal to connected applications APP, so that each application APP once again has access to a neutral data record.

If an application APP no longer requires access to a terminal which has been controlled until then, it signals this to the telephony server TSP by an appropriate message. FIG. 7 schematically illustrates the release process, in which the application APP uses the "free ID004" message to signal to the telephony server TSP that it no longer requires access to the terminal D7 with the telephone number 356. The telephony server TSP now checks whether another application is accessing the terminal D7, that is to say controlling and/or monitoring it, via the data record with the identification number ID004 in the databank DB. This is not the case here, so that the telephony server TSP removes the data record with the identification number ID004 by deleting it from the databank, and thus once again releases the memory space which has until then been occupied by this data record ID004. This process is illustrated schematically in FIG. 8.

As mentioned initially, there are various possible ways to start an application and to access the data records in the databank DB. On the one hand, it is possible for an application APP to read all of the data records that are available in the databank DB and to initiate the conversion of the or of a neutral data record to a regular data record in those situations in which a terminal to be controlled is not yet represented by a data record in the databank. The next option is for an application first of all to send a request to the telephony server TSP to control a terminal, and thus to check whether the terminal of interest is already represented by a data record in the databank DB. In this case, no neutral data record is converted to a regular data record unless the terminal of interest is not represented. The third option is for the application APP in any case to access the neutral data record in the data bank DB in order to control a terminal which has so far not yet been controlled by the corresponding application APP, and to assign the telephone number and the specific information for the terminal of interest to this neutral data record in the described manner.

This last-mentioned method on the one hand has the advantage that there is no need for any additional checking steps in the databank DB, thus resulting in fast access to a further terminal which is to be monitored or to be controlled, and on the other hand has the advantage that a terminal which no longer need be controlled by this application can be released without having to start a check to determine whether the corresponding data record (that is to say the corresponding "line") is still being used by other applications. On the other hand, this has the disadvantage that, in the case of the last-mentioned method, one and the same terminal will in some circumstances be represented two or more times by data records in the telephony server, thus increasing the memory requirement. The corresponding procedure is predetermined by the respective application APP or by the telephony server TSP; all three modes of operation can be carried out using the arrangement illustrated in FIG. 1.

The invention claimed is:

1. A method for controlling and/or monitoring a first terminal connected to a communication system, the first terminal having at least one function which can be controlled and/or monitored, the method comprising:
    sending a first message to a telephony server by an application installed on a computer, the first message having a telephone number of the first terminal;
    transmitting the telephone number to the communication system by the telephony server;
    transmitting terminal information by the communication system in a response, wherein the terminal information describes which of the functions of the first terminal can be controlled and/or monitored;
    providing a data base by the telephony server, the data base comprising data records describing a plurality of terminals that can be controlled and/or monitored, wherein at least one data record includes the telephone number and the terminal information received from the communication system regarding the first terminal, wherein the data base has at least one amendable data record having an identification number, wherein one of the terminals is assigned to the amendable data record, and wherein the amendable data record is supplemented by the telephone number and the terminal information received from the communication system regarding the first terminal; and
    transmitting the telephone number and the terminal information obtained from the supplemental data record to the computer by the telephony server such that the first terminal is controlled and/or monitored by the computer.

2. The method as claimed in claim 1, wherein a communication terminal, a subscriber connection, an exchange connection, a cross-connect connection or some other connection which can be controlled and/or monitored in a communication system is used for the terminal to be controlled.

3. The method as claimed in claim 1, wherein a communication node in a packet-switching network is used as the communication system.

4. The method as claimed in claim 2, wherein a communication node in a packet-switching network is used as the communication system.

5. The method as claimed in claim 1, wherein the telephony server interchanges terminal information with two or more communication systems.

6. The method as claimed in claim 2, wherein the telephony server interchanges terminal information with two or more communication systems.

7. The method as claimed in claim 3, wherein the telephony server interchanges terminal information with two or more communication systems.

8. The method as claimed in claim 1, wherein one terminal is controlled and/or monitored by two or more computers comprising installed applications.

9. The method as claimed in claim 2, wherein one terminal is controlled and/or monitored by two or more computers comprising installed applications.

10. The method as claimed in claim 3, wherein one terminal is controlled and/or monitored by two or more computers comprising installed applications.

11. The method as claimed in claim 5, wherein one terminal is controlled and/or monitored by two or more computers comprising installed applications.

12. The method as claimed in claim 1, wherein the amended data record is deleted when no computer is controlling and/or monitoring the terminal associated to that data record.

13. The method as claimed in claim 1, further comprising: creating a further amendable data record by the telephony server based on the supplemental data record, wherein the further amendable data record has a further identification number.

14. The method as claimed in claim 1, wherein the number of amendable data records in a telephony server is always at least one.

15. The method as claimed in claim 14, wherein exactly one amendable data record is always available.

16. A control monitoring system for controlling and/or monitoring a terminal having at least one function which can be controlled and/or monitored, the control-monitoring system comprising:
    a communication system, wherein the terminal is connected to the communication system;
    a telephony server connected to the communication system for exchanging terminal information and having a data base; and
    a computer connected to the telephony server, wherein an application for controlling and/or monitoring is installed on the computer, wherein
    the application is adapted to transmit to the telephony server a first message including the telephone number of the terminal, wherein the telephony server has means for transmitting the telephone number to the communication system, wherein the communication system is adapted to transmit the terminal information in a response, wherein the terminal information describes which functions of the terminal can be controlled and/or monitored, wherein the data base has data records related to a plurality of terminals which can be controlled and/or monitored, wherein at least one data record is amended by the telephone number and the information received from the communication system regarding the terminal, wherein the data base has at least one amendable data record containing an identification number and to which one of the plurality of terminals is assigned, wherein the data record is supplemented by the telephone number and the terminal information received from the communication system regarding the terminal, wherein the telephony server is adapted to produce a further amendable data record comprising a further identification number after supplementing the data record, and wherein the telephony server is further adapted to transmit the telephone number and the terminal information obtained from the supplemented data record to the computer such that the terminal can be controlled and/or monitored by the computer.

17. The control-monitoring system as claimed in claim 16, wherein the terminal to be controlled is a communication terminal, a subscriber connection, an exchange connection, a cross-connect connection or some other connection of a communication system which can be controlled and/or monitored.

18. The control-monitoring system as claimed in claim 16, wherein the communication system is a communication node in a packet-switching network.

19. The control-monitoring system as claimed in claim 16, wherein the telephony server comprises a mechanism for exchanging terminal information between two or more communication systems.

20. The control-monitoring system as claimed in claim 16, wherein two or more computers with application are provided for controlling and/or monitoring a terminal.

* * * * *